United States Patent Office

Re. 24,242

Reissued Dec. 4, 1956

24,242

ALLOYS AND ELECTRICAL RESISTANCE ELEMENTS

James M. Lohr, Morristown, N. J., assignor to Driver-Harris Company, Harrison, N. J., a corporation of New Jersey No Drawing. Original No. 2,581,420, dated January 8, 1952, Serial No. 117,510, September 23, 1949. Application for reissue June 29, 1956, Serial No. 595,041

16 Claims. (Cl. 75—171)

Matter enclosed in heavy brackets [ ] appears in the original patent but forms no part of this reissue specification; matter printed in italics indicates the additions made by reissue.

This invention relates to alloys and more particularly to alloys for electric resistance units.

In the manufacture of electrical resistance units, an alloy having the property of resisting oxidation at high temperature is essential. The alloys forming the subject matter of this invention are characterized by ability to resist oxidation and by a prolonged life, exceeding that of other known alloys when used under high temperature conditions. Since the introduction of nickel-chromium-iron alloys as electric resistance units many developments have occurred that have improved their resistance to oxidation. In a number of prior patents I have disclosed and claimed various alloying additions of calcium, zirconium and aluminum which greatly improve the life of heating elements. It has also been proposed to add rare earth metals, such as cerium, to nickel-chromium-iron alloys to improve the life of the heating elements.

I have found that when calcium and aluminum as well as rare earth metals are added to nickel-chromium-iron alloys, better results are obtained than if the calcium, zirconium, aluminum group or the rare earths are used alone. The present invention is, therefore, directed to the addition of small quantities of the rare earths with calcium and aluminum to nickel-chromium-iron alloys. I have found that such combination of addition elements greatly increases the period of life of nickel-chromium-iron alloys when employed under conditions where they are subjected to high temperatures. The alloys forming the subject matter of the present invention may also contain small amounts of either silicon or manganese or both of these elements. The rare earth metals may be added as "Misch Metal" having an approximate composition of 45 percent cerium, 30 percent lanthanum, 20 percent ytterbium and didymium. Although it is convenient to add the rare earth metals in the form of "Misch Metal," I do not restrict myself to the use of this material as one or more of the rare earth metals may be added singly and its effect is of a similar nature. The additions may be used to advantage with the nickel-chromium-iron alloys of which the best known examples are the alloys of 30 to 70 percent nickel, 10 to 25 percent chromium, balance iron. However, the proportions of these alloys may be varied with the nickel forming a substantial part of the alloys. The claims of this application are directed to an alloy containing 50 to 70 percent nickel. Alloys containing from 30 to 50 percent nickel form the subject matter of a divisional application, Serial No. 252,198, filed October 19, 1951, now Patent No. 2,687,954.

In the examples hereinafter described, the additions were made to the alloys consisting of substantially 60 percent nickel, 15 percent chromium and balance iron. Rare earth metals, such as Misch Metal, with calcium and aluminum may be added to such alloys with or without silicon. The proportions of nickel in such alloys may vary from 50 to 70 percent and the chromium from 10 to 20 percent with the balance iron. Employing nickel-chromium-iron alloys of these proportions, I have added calcium, aluminum and Misch Metal in the quantities or amounts hereinafter mentioned.

In preparing alloys containing the addition elements above mentioned, the quantities of such addition elements are subtracted from the iron content. For example, when additions are made to base alloys containing 50 to 70 percent nickel, 10 to 25 percent chromium, the final alloys will contain 50 to 70 percent nickel, 10 to 25 percent chromium, the addition elements calcium, aluminum and the rare earth metals in the percentages hereinafter stated, and the balance iron. While the propositions of calcium, aluminum and rare earth metals may vary within certain limits, I have found that the best results are obtained when these materials are present in the final alloys within the following limits:

| | Percent |
|---|---|
| Calcium | .01–.20 |
| Aluminum | .01–1.0 |
| Rare earth metals | Trace–0.50 |

If the alloys contain manganese, silicon, or carbon, they may be present within the following limits:

| | Percent |
|---|---|
| Manganese | .02–4.0 |
| Silicon | .20–3.0 |
| Carbon | 0.25 max. |

While alloys having the properties desired to a very high degree are obtained within the limits before mentioned, the preferred range of addition elements is as follows:

| | Percent |
|---|---|
| Calcium | .03–.07 |
| Aluminum | .07–.40 |
| Rare earth metals | Trace–0.20 |
| Manganese | .05– 1 |
| Silicon | .75–2.0 |

Alloys so prepared have been tested for resistance to oxidation at high temperature by the method approved by the American Society for Testing Materials Accelerated Life Test for Metallic Materials, B76–39. In conducting such test, the alloy is produced in the form of a wire, drawn to a diameter of approximately .025" and tested at a temperature of 2050° F. The "useful life" in hours for wire of prior compositions in current production containing .04 percent calcium, .10 percent zirconium and .12 percent aluminum is of the order of 200 hours. The useful life of alloys of the present invention, according to the above described test, is of the order of 500 to 700 hours. Thus, the useful life is increased 250 to 300 percent over that of the alloys containing the calcium, zirconium, aluminum group when the rare earth metals are added with calcium and aluminum in the proportions herein stated.

The alloys are prepared in the usual manner by placing the ingredients in a bath, heating until the alloying elements become molten and then pouring. In adding rare earth metals to a molten bath, it is necessary to add considerably larger quantities than will be found in the cast metal because they vaporize readily and pass out of the bath. In many instances, with additions of the rare earth metals only a spectrographic trace of one or more of the rare earth metals is found in the cast material. The presence of such traces, however, in combination with calcium and aluminum, greatly increases the oxidation resistance of the alloys. The rare earth metals may be added in amounts sufficient to leave the residue in the cast alloys up to .2 percent but in most instances the use of such amounts is not necessary.

In the test referred to above the increase of electrical resistance at temperature with time is plotted and an increase of 10 percent in resistance is known as the "useful life." The life of the tested specimen to burn-out is known as "total life."

The invention may be employed in connection with the 35–15 alloys in which the alloys contain 30 to 40% nickel, 10 to 25% chromium, and balance iron. The addition elements are present in substantially the same proportions as heretofore stated in connection with the 60–15 alloys, which contain substantially 60% nickel, substantially 10 to 20% chromium, balance iron.

I claim:

1. A nickel-chromium-iron alloy consisting essentially of 50 to 70 percent nickel, 10 to 25 percent chromium, .01 to .20 percent calcium, .01 to 1.0 percent aluminum, a trace to .50 percent of a rare earth metal, balance essentially iron.

2. A nickel-chromium-iron alloy consisting essentially of 50 to 70 percent nickel, 10 to 25 percent chromium, substantially .04 percent calcium, .07 to .40 percent aluminum, a trace to .20 percent of a rare earth metal, balance essentially iron.

3. A nickel-chromium-iron alloy consisting essentially of substantially 60 percent nickel, substantially 15 percent chromium, .01 to .20 percent calcium, .01 to 1.0 percent aluminum, a trace to .50 percent of a rare earth metal, balance essentially iron.

4. A nickel-chromium-iron alloy consisting essentially of substantially 60 percent nickel, substantially 15 percent chromium, substantially .04 percent calcium, .07 to .40 percent aluminum, a trace to .20 percent of a rare earth metal, balance essentially iron.

5. A nickel-chromium-iron alloy consisting essentially of 50 to 70 percent nickel, 10 to 25 percent chromium, .01 to .20 percent calcium, .01 to 1.0 percent aluminum, a trace to .50 percent of cerium and lanthanum, balance essentially iron.

6. A nickel-chromium-iron alloy consisting essentially of substantially 60 percent nickel, substantially 15 percent chromium, .01 to .20 percent calcium, .01 to 1.0 percent aluminum, a trace to .50 percent of cerium and lanthanum, balance essentially iron.

7. A nickel-chromium-iron alloy consisting essentially of 50 to 70 percent nickel, 10 to 25 percent chromium, substantially .04 percent calcium, .07 to .40 percent aluminum, a trace to .20 percent of cerium and lanthanum, balance essentially iron.

8. A nickel-chromium-iron alloy consisting essentially of substantially 60 percent nickel, substantially 15 percent chromium, substantially .04 percent calcium, .07 to .40 percent aluminum, a trace to .20 percent of cerium and lanthanum, balance essentially iron.

*9. An electric resistance element consisting essentially of 50 to 70 percent nickel, 10 to 25 percent chromium, .01 to .20 percent calcium, .01 to 1.0 percent aluminum, a trace to .50 percent of a rare earth metal, balance essentially iron.*

*10. An electric resistance element consisting essentially of 50 to 70 percent nickel, 10 to 25 percent chromium, substantially .04 percent calcium, .07 to .40 percent aluminum, a trace to .20 percent of a rare earth metal, balance essentially iron.*

*11. An electric resistance element consisting essentially of substantially 60 percent nickel, substantially 15 percent chromium, .01 to .20 percent calcium, .01 to 1.0 percent aluminum, a trace to .50 percent of a rare earth metal, balance essentially iron.*

*12. An electric resistance element consisting essentially of substantially 60 percent nickel, substantially 15 percent chromium, substantially .04 percent calcium, .07 to .40 percent aluminum, a trace to .20 percent of a rare earth metal, balance essentially iron.*

*13. An electric resistance element consisting essentially of 50 to 70 percent nickel, 10 to 25 percent chromium, .01 to .20 percent calcium, .01 to 1.0 percent aluminum, a trace to .50 percent of cerium and lanthanum, balance essentially iron.*

*14. An electric resistance element consisting essentially of substantially 60 percent nickel, substantially 15 percent chromium, .01 to .20 percent calcium, .01 to 1.0 percent aluminum, a trace to .50 percent of cerium and lanthanum, balance essentially iron.*

*15. An electric resistance element consisting essentially of 50 to 70 percent nickel, 10 to 25 percent chromium, substantially .04 percent calcium, .07 to .40 percent aluminum, a trace to .20 percent of cerium and lanthanum, balance essentially iron.*

*16. An electric resistance element consisting essentially of substantially 60 percent nickel, substantially 15 percent chromium, substantially .04 percent calcium, .07 to .40 percent aluminum, a trace to .20 percent of cerium and lanthanum, balance essentially iron.*

References Cited in the file of this patent or the original patent

UNITED STATES PATENTS

| | | |
|---|---|---|
| 2,005,431 | Lohr | June 18, 1935 |
| 2,047,916 | Lohr | July 14, 1936 |
| 2,047,917 | Lohr | July 14, 1936 |
| 2,047,918 | Lohr | July 14, 1936 |

FOREIGN PATENTS

| | | |
|---|---|---|
| 488,926 | Great Britain | July 12, 1948 |